US006831262B2

(12) United States Patent
Nagashima

(10) Patent No.: US 6,831,262 B2
(45) Date of Patent: Dec. 14, 2004

(54) METHOD OF DETERMINING CHARACTERISTIC CORRECTION DATA FOR CORRECTING OUTPUT SIGNAL FROM IMAGE SENSOR

(75) Inventor: Kanji Nagashima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 271 days.

(21) Appl. No.: 09/984,035

(22) Filed: Oct. 26, 2001

(65) Prior Publication Data

US 2002/0050556 A1 May 2, 2002

(30) Foreign Application Priority Data

Oct. 27, 2000 (JP) ........................................ 2000-329376

(51) Int. Cl.[7] .............................................. H01L 27/00
(52) U.S. Cl. .................................... 250/208.1; 250/204
(58) Field of Search .............................. 250/208.1, 204; 358/463, 486, 474, 462, 448, 452, 461, 1.9; 382/274, 275; 702/85, 104; 348/251

(56) References Cited

U.S. PATENT DOCUMENTS 5,801,962 A * 9/1998 Sheu et al. ................... 702/85

6,006,013 A * 12/1999 Rumph et al. ............. 358/1.15

* cited by examiner

Primary Examiner—David V. Bruce
Assistant Examiner—Hoon Song
(74) Attorney, Agent, or Firm—Sughrue Mion, PLLC

(57) ABSTRACT

There is disclosed a method of determining characteristic correction data from reference data values picked up through an image sensor by scanning a reference original a plurality of times per one photoelectric conversion element of the image sensor. A running mean value of the reference data values is calculated with respect to a respective one of the photoelectric conversion elements, and is served as low spatial frequency component data. High spatial frequency component data is obtained by subtracting the running mean values from the reference data values with respect to the respective one of the photoelectric conversion elements. Noise components are eliminated from the high spatial frequency component data by averaging only those data values of the high spatial frequency component data which are not less than $AV-K\sigma$ and not more than $AV+K\sigma$, wherein AV is a mean value and $\sigma$ is a standard deviation of the high spatial frequency component data, and K is a predetermined constant.

22 Claims, 14 Drawing Sheets

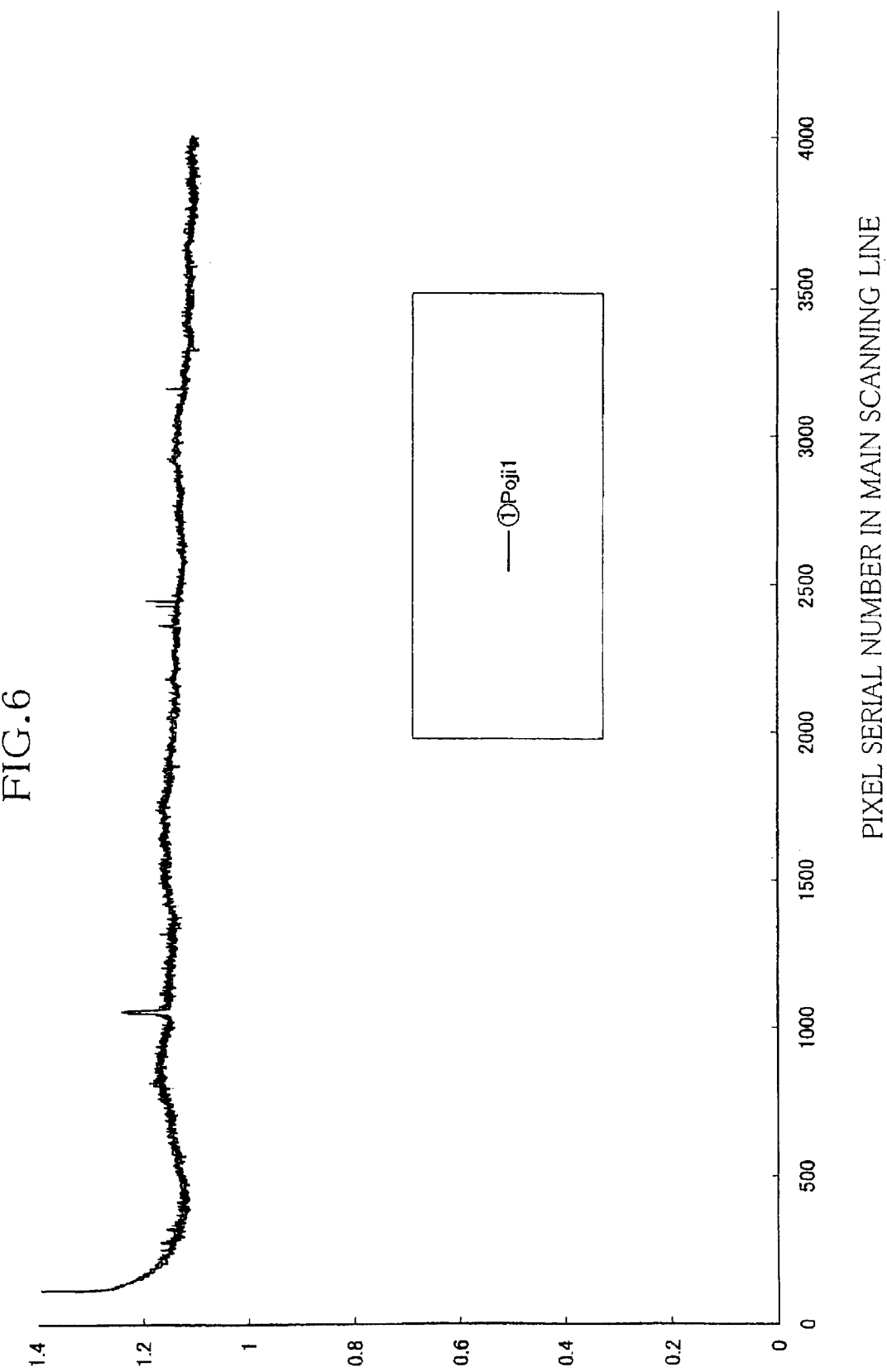

FIG. 14
(PRIOR ART)

PHOTO SENSITIVITY

—— SENSITIVITY OF A CCD CELL
------ SENSITIVITY OF A SECOND CCD CELL 400    700
WAVELENGTH (nm)

FIG. 15
(PRIOR ART)

LIGHT AMOUNT ON ORIGINAL

LINE DIRECTION OF LINEAR CCD

FIG. 16
(PRIOR ART)

CCD OUTPUT (R)

PIXEL SERIAL NUMBER IN MAIN SCANNING LINE

METHOD OF DETERMINING CHARACTERISTIC CORRECTION DATA FOR CORRECTING OUTPUT SIGNAL FROM IMAGE SENSOR

BACKGROUND OF THE INVENTION

1. Field of the Invention

The present invention relates to a method of determining characteristic correction data for correcting photoelectric signals detected from an original through an image sensor, so as to cancel influences of variations in photosensitivity and spectral characteristics between sensor cells, like CCD cells, and unevenness in illumination light amount on the original.

2. Background Arts

Recently, it has been known picking up image data from originals, such as picture frames on photographic film, through an image sensor, like a CCD image sensor, and using the picked up image data for making hard copies of the originals or for displaying still video images of the originals after processing and correcting the image data appropriately. In a linear CCD image sensor, the photographic film or other light-permeable original is moved at a constant speed in a sub scanning direction perpendicular to a line direction of the linear CCD image sensor, so the light passing through the original is detected by the image sensor, to pick up image data from the original. To pick up image data from reflective originals, like photographic prints or other printed matters, the linear CCD detects light reflected from these originals as the original is moved in the sub scan direction.

As well-known in the art, the CCD image sensor is constituted of a plurality of photoelectric conversion elements, called CCD cells. Since there are variations in photosensitivity between the CCD cells, as shown in FIG. 14, and it is hard to illuminate the original completely uniformly, as shown in FIG. 15, the signal levels from the CCD cells are not always equal even while the original is uniform in color and brightness, as shown in FIG. 16. Such unevenness in the output signals is called "shading". To prevent the shading from affecting the image data, the output signals from the image sensor should be corrected in accordance with the sensitivity variations between the CCD cells.

Specifically, regarding a film scanner for photographic film, a photo filmstrip having a base density in the whole are film having a reference light permeability is used as a reference original, and the shading is detected by scanning the reference original. On the basis of the CCD output signals obtained by scanning the reference original, that may be called reference data, shading correction data is determined for each CCD cell such that the reference data are made equal to each other when corrected with the shading correction data, and that the three primary colors are well-balanced in the image data of the reference original after the correction. Thus, by correcting CCD output signals detected from respective picture frames on photographic film with the shading correction data, the influence of shading is canceled. Regarding the image scanner for the reflective originals, a white sheet or the like is used as a reference original for detecting the shading and obtaining shading correction data.

According to a conventional method for producing such shading correction data, noise components are eliminated from the shading correction data by averaging reference data values of those pixels which are detected from the reference original by the same CCD cell of the linear CCD image sensor through 5 to 128 times of scanning of that reference original. In other words, the noises are eliminated by averaging data values of one color of those pixels which are located at the same position in the main scanning direction on the 5 to 128 main scanning lines.

However, the conventional method cannot sufficiently eliminate those noise components which result from stains, scratches and dusts on the reference original. Since these noise components are similar in size to the shading correction data obtained from the reference original, it has been difficult to distinguish the noise components from the valid data. Thus, the noises can appear as streaks in the image obtained through the linear CCD image sensor if the stain, scratch or dust on the reference original has a certain degree.

SUMMARY OF THE INVENTION

In view of the foregoing, an object of the present invention is to provide a method of determining characteristic correction data, whereby noise components resulting from stains, scratches and dusts on a reference original are well eliminated from output signals of the image sensor which are detected from the reference original. Thereby, the characteristic correction data may be determined based on the output signals detected from the reference original, without being affected by the noise components.

Another object of the present invention is to provide an apparatus for determining characteristic correction data by use of the method of the present invention.

According to an aspect of the present invention, in a method of determining characteristic correction data based on reference data values picked up through an image sensor by scanning at least a reference original a plurality of times per one photoelectric conversion element of the image sensor, wherein the reference original is uniform in density or in color and density, and the characteristic correction data is correcting characteristics of the respective photoelectric conversion elements, the method comprises steps of:

discriminating the reference data values between data of high spatial frequency components and data of low spatial frequency components; and processing the high spatial frequency component data and the low spatial frequency component data differently from each other, to produce the characteristic correction data.

"Correcting characteristics of the respective photoelectric conversion elements" means correcting photoelectric signals detected through the respective photoelectric conversion elements of the image sensor, so as to cancel influences of variations in sensitivity between the photoelectric conversion elements, including variations in spectral characteristics between these elements, and unevenness in illumination light amount on the original.

Each of the photoelectric conversion elements picks up the reference data values from different points of the same reference original, or from a plurality of reference originals having the same properties.

According to a preferred embodiment, the discrimination step comprising steps of:

calculating a running mean value of the reference data values with respect to a respective one of the photoelectric conversion elements, to serve the running mean values as the low spatial frequency component data; and subtracting the running mean values from the reference data values with respect to the respective one of the photoelectric conversion elements, to serve subsequent differences as the high spatial frequency component data.

The processing step preferably comprises steps of eliminating noises respectively from the high spatial frequency component data and the low spatial frequency component data; and thereafter adding the high spatial frequency component data and the low spatial frequency component data to each other in association with the respective one of the photoelectric conversion elements.

According to another aspect of the present invention, an apparatus for determining characteristic correction data comprises:

a reference data picking up device for picking up reference data values through an image sensor by scanning at least a reference original a plural number of times per one photoelectric conversion element of the image sensor, the reference original being uniform in density or in color and density;

a discrimination device for discriminating the reference data values between data of high spatial frequency components and data of low spatial frequency components;

a noise eliminating device for eliminating noise components from the high spatial frequency component data, the noise components resulting from noise factors existing on the reference original; and a correction data calculating device that calculates a mean value of the plural number of data values of the high spatial frequency components after the noise components are eliminated, and a mean value of the plural number of data values of the low spatial frequency components with respect to the respective one of the photoelectric conversion elements, and then adds the mean values of the low and high spatial frequency component data with respect to the respective one of the photoelectric conversion elements, to produce the characteristic correction data for each photoelectric conversion element.

It is to be noted that "frequency" means spatial frequency in the following description.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 6 is a graph of broken line illustrating a fragment of a first positive table Pojil for the first main scanning line;

FIG. 14 is a graph illustrating an example of difference in characteristic curves between CCD cells:

FIG. 15 is a graph illustrating an example of unevenness in illumination light amount on an original; and FIG. 16 is a graph illustrating an example of output signals for red pixels of one line obtained through a linear CCD image sensor.

DETAILED DESCRIPTION OF THE EMBODIMENTS

Figure 1:
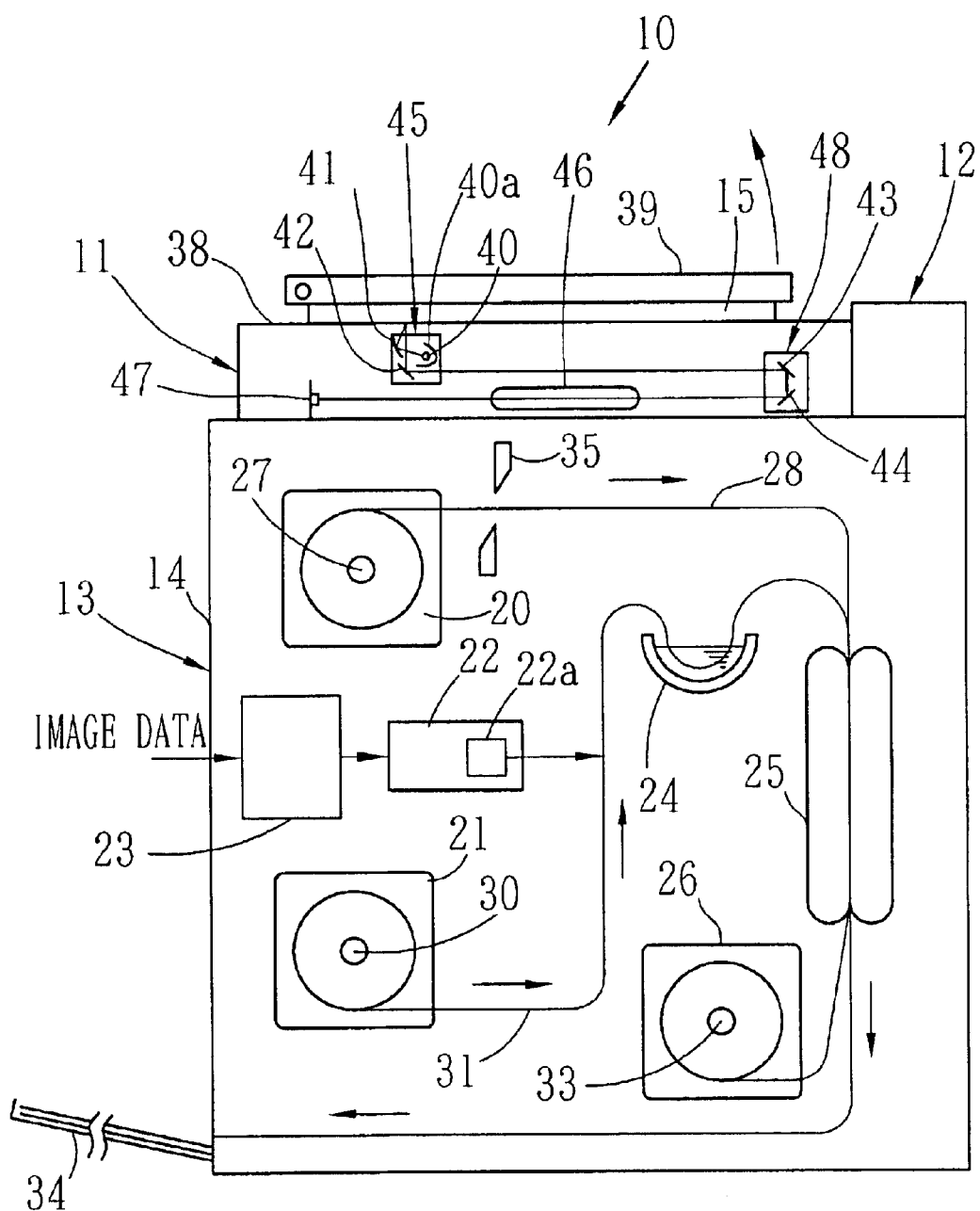
FIG. 1 is a schematic diagram illustrating a heat-developing image transfer type printer embodying the characteristic correction data determining method of the present invention.

In FIG. 1, a heat-developing image transfer type printer 10 embodying the present invention consists of a reflective original scanner 11, a film scanner 12 and an image forming section 13. The scanners 11 and 12 are disposed on top of a machine frame 14. The image forming section 13 is constituted of an image receiving material loading section 20, a photosensitive material loading section 21, a laser scanning section 22, an exposure data producer 23, a water coating section 24, a heat developing section 25, and a photosensitive material wind-up section 26. An image receiving material 28 coiled around a spool 27 is loaded in the image receiving material loading section 20, and is fed out to the heat developing section 25. A photosensitive material 31 coiled around a spool 30 is loaded in the photosensitive material loading section 21, and is fed out to the laser scanning section 22.

The laser scanning section 22 is provided with a laser 22a that projects a light beam onto the photosensitive material 31 and scans the light beam across the photosensitive material 31. The laser 22a is connected to the exposure data producer 23, so the laser 22a is driven in accordance with exposure data produced from image data by the exposure data producer 23. Thus, an image is optically recorded on the photosensitive material 31 in correspondence with the image data. The image data is supplied to the exposure data producer 23 from the reflective original scanner 11 or the film scanner 12, or from an external apparatus. As the externally supplied image data, there are those obtained through digital cameras and external scanners, those produced from computers and recorded to storage media, like FD, MO, CD, DVD, and those transferred from computers to the printer 10 through LAN and the Internet.

After being exposed in the laser scanning section 22, the photosensitive material 31 is fed to the water coating section 24, so the water is spread over a photosensitive surface of the photosensitive material 31. Thereafter while the photosensitive material 31 is being fed to the heat developing section 25, the image receiving material 28 is put on the photosensitive surface of the photosensitive material 31 through the water. The heat developing section 25 contains a heater, and heats and presses the image receiving material 28 and the photosensitive material 31 together. As a result, the image recorded on the photosensitive material 31 is developed and transferred onto the image receiving material 28.

After the development and transfer of the image, the image receiving material 28 and the photosensitive material 31 are peeled apart, and the photosensitive material 31 is wound up onto a take-up spool 33 of the photosensitive material wind-up section 26, whereas the image receiving material 28 is ejected onto a tray 34 that is mounted on one side of the machine frame 14. The used photosensitive material 31 on the take-up spool 33 is processed as a waste material. Although a cutter 35 for cutting the image receiving material 28 into a predetermined length is disposed between the image receiving material loading section 20 and the heat developing section 25 in the embodiment of FIG. 1, the cutter 35 may be disposed at a downstream position from the heat developing section 25.

The reflective original scanner 11 is provided with a transparent table 38 for placing a reflective original 15 thereon. A cover 39 for holding the original 15 flat on the transparent table 38 is mounted on the transparent table 38 so as to be movable between an open position and a closed position. Below the transparent table 38 are disposed a light source 40, reflectors 40a, 41, 42, 43 and 44, carriages 45 and 48, a lens unit 46 and a linear CCD image sensor 47. The light source 40 and the reflectors 40a, 41 and 42 are mounted fixedly to the carriage 45, whereas the reflectors 43 and 44 are mounted fixedly to the carriage 48. The light from the light source 40 illuminates the original 15 on the transparent table 38 through the reflectors 40a and 41. Light reflected from the original 15 is directed through the reflectors 42 to 44 to the lens unit 46, and focused on the CCD image sensor 47 through the lens unit 46. The carriages 45 and 48 moves parallel to the transparent table 38. The lens unit 46 is movable along an optical axis of the light from the reflector 44, and constitutes a zoom lens that forms an image on the CCD image sensor 47 at an appropriate magnification. The image data is produced from photoelectric output signal from the CCD image sensor 47, and is sent to the exposure data producer 23.

The film scanner 12 scans picture frames on photographic film. The film scanner 12 may scan different types of photographic film, including negative and reversal filmstrips of ISO135 type, ISO110 type, ISO120 type, ISO220 type and IX240 type. Different types of film carriers are used for the different film types, or a compatible film carrier whose film passageway and masking size are changeable is commonly used for some film types.

Figure 2:
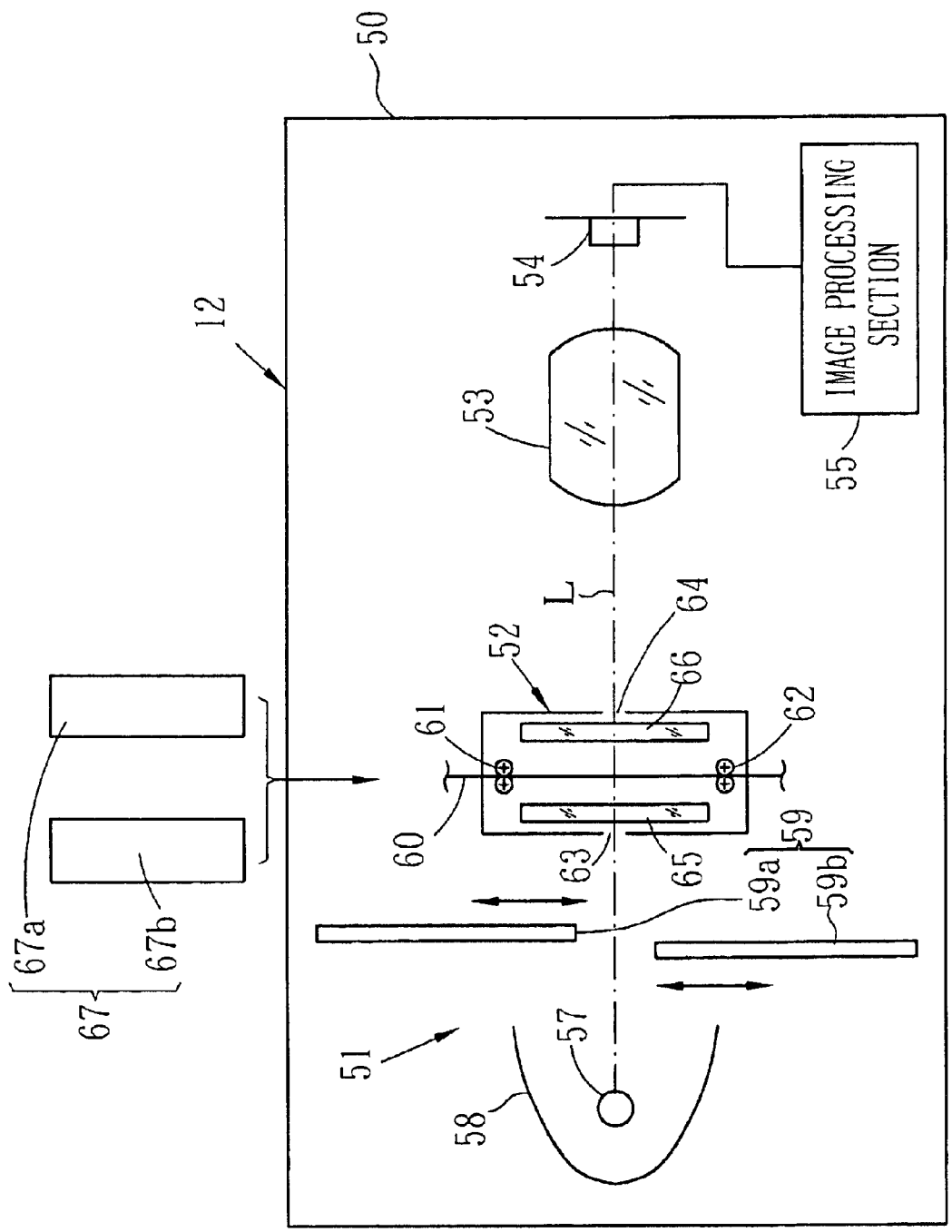
FIG. 2 is a schematic diagram illustrating a film scanner united with the printer of FIG. 1.

FIG. 2 shows the film scanner 12. The film scanner 12 is constituted of a light source section 51, a film carrier 52, a lens unit 53, a linear CCD image sensor 54 and an image processing section 55 which are encased in a casing 50. The light source section 51 consists of a lamp 57, e.g. a halogen lamp or a metal halide lamp, and a reflector 58. The reflector 58 has a concave reflection surface surrounding the lamp 57, and the light from the lamp 57 is projected toward the film carrier 52 in a direction along an optical axis L.

A light source stop 59 is disposed between the light source section 51 and the film carrier 52. The light source stop 59 has a pair of stop blades 59a and 59b that are movable radially to the optical axis L, thereby to change the size of an opening formed between these stop blades 59a and 59b and thus control the amount of light illuminating a photo film 60 located in the film carrier 52, the photo film 60 may be a positive film or a negative film of a particular type. As described above, the film carrier 52 is changeable in accordance with the type of the photo film 60. The film carrier 52 has film feed roller pairs 61 and 62 for nipping and feeding the photo film 60 in a lengthwise direction of the photo film 60 perpendicularly to the optical axis L. An entrance slit 63 and an exit slit 64 are formed through the film carrier 52 such that the slits 63 cross the optical axis L in a line direction of the CCD image sensor 54, that is equal to a widthwise direction of the photo film 60, i.e. a transverse direction to the film feeding direction. Hereinafter, the line direction of the CCD image sensor 54 will be called a main scan direction, whereas the film feeding direction will be called a sub scan direction.

A diffusion plate 65 and a glass plate 66 are disposed inside the film carrier 52 on the side of the entrance slit 63 and the exit slit 64 respectively, to protect the interior of the film carrier 52 from dusts that might enter through the slits 63 and 64. The diffusion plate 65 also diffuses the light from the light source 51, to illuminate the photo film 60 uniformly. In place of the photo film 60, a reference original 67 may be set in the film carrier 52, for detecting the shading that could be resulted from unevenness of the illumination light, or variations in sensitivity between CCD cells of the CCD image sensor 54. As the reference original 67, there are provided a positive reference original 67a for the positive films, and a negative reference original 67b for the negative films. The positive reference original 67a has flat spectral transmittance characteristics that are substantially similar to the positive film's. In the present embodiment, a neutral density (ND) filter is used as the positive reference original 67a. The negative reference original 67b has spectral transmittance characteristics that are substantially similar to a base material of the negative film.

The lens unit 53 forms an image on the CCD image sensor 54 from light passing through the photo film 60. The lens unit 53 is movable along the optical axis L, so the image is formed on the CCD image sensor 54 at an appropriate magnification. By making the image magnification changeable, scanning resolution becomes controllable.

The CCD image sensor 54 has a CCD array consisting of three rows of CCD cells, each row extending in the main scan direction and shifted from each other in the sub scan direction. The CCD cells of one row detect light of a different one of the three primary colors (red, green, blue) from the CCD cells of other rows. In synchronism with the feeding movement of the photo film 60 through the film carrier 52, electric charges accumulated in the respective CCD cells are sent as line signals to the image processing section 55. The electric charge accumulated in one CCD cell represents a color density of a pixel of a main scanning line of a picture frame on the photo film 60. That is, each CCD cell corresponds to a pixel of one color on each main scanning line, and the line signals from the CCD image sensor 54 represent three color densities of respective pixels of one main scanning line.

Figure 3:
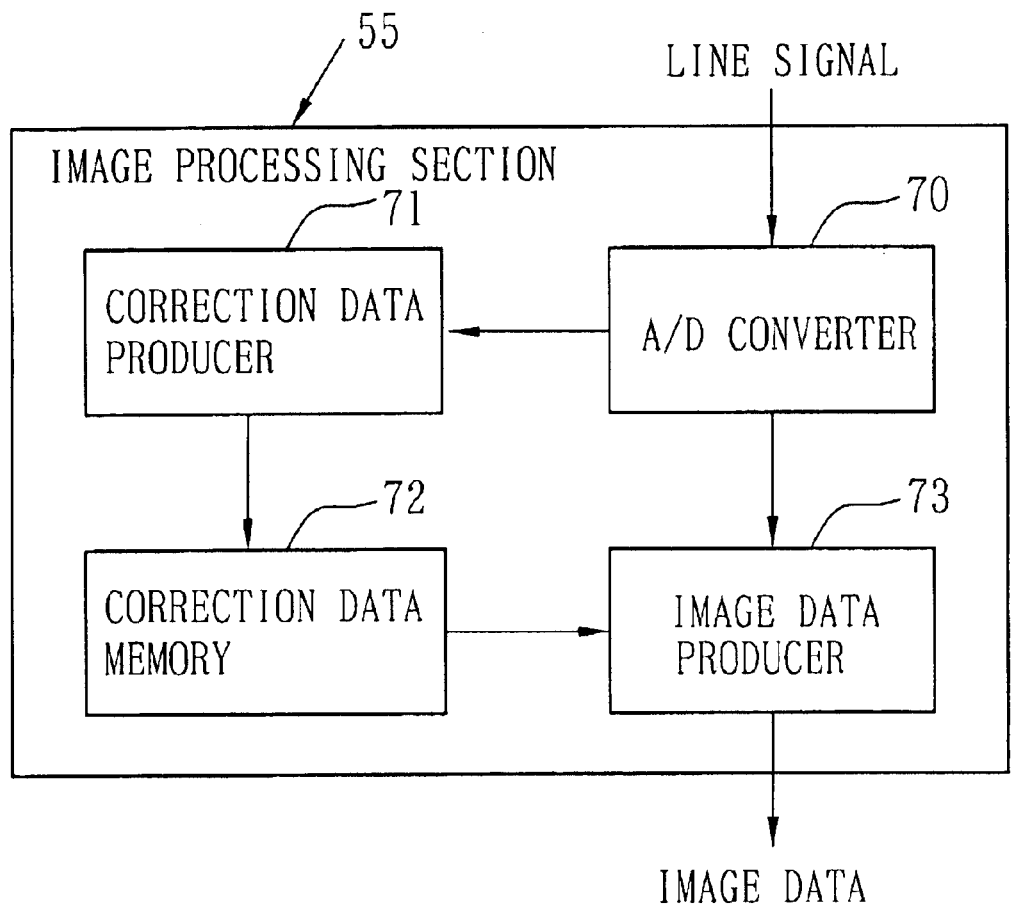
FIG. 3 is a block diagram illustrating an image processing section of the film scanner of FIG. 2.

As shown in FIG. 3, the image processing section 55 is provided with an A/D converter 70, a correction data producer 71, a correction data memory 72 and an image data producer 73. The A/D converter 70 converts the line signals into a digital form. The correction data producer 71 produces correction data from the digital output of the 70 that is obtained while the reference original 67a or 67b is set in the film carrier 52 and is scanned through the CCD image sensor 54. The correction data memory 72 stores the produced correction data.

The image data producer 73 corrects the digital output from the 70 with the correction data, while the photo film 60 is set in the film carrier 52 and scanned through the CCD image sensor 54. More particularly, the correction data detected with respect to the negative reference original 67b is used when the photo film 60 is negative, whereas the correction data detected with respect to the positive reference original 67a is used when the photo film 60 is positive. Image data is thus produced from the digital output from the 70 by correcting it with the correction data, and is sent to the exposure data producer 23. Although it is omitted from the drawings, the scanners 11 and 12 may have an image memory for storing the image data.

Figure 4:
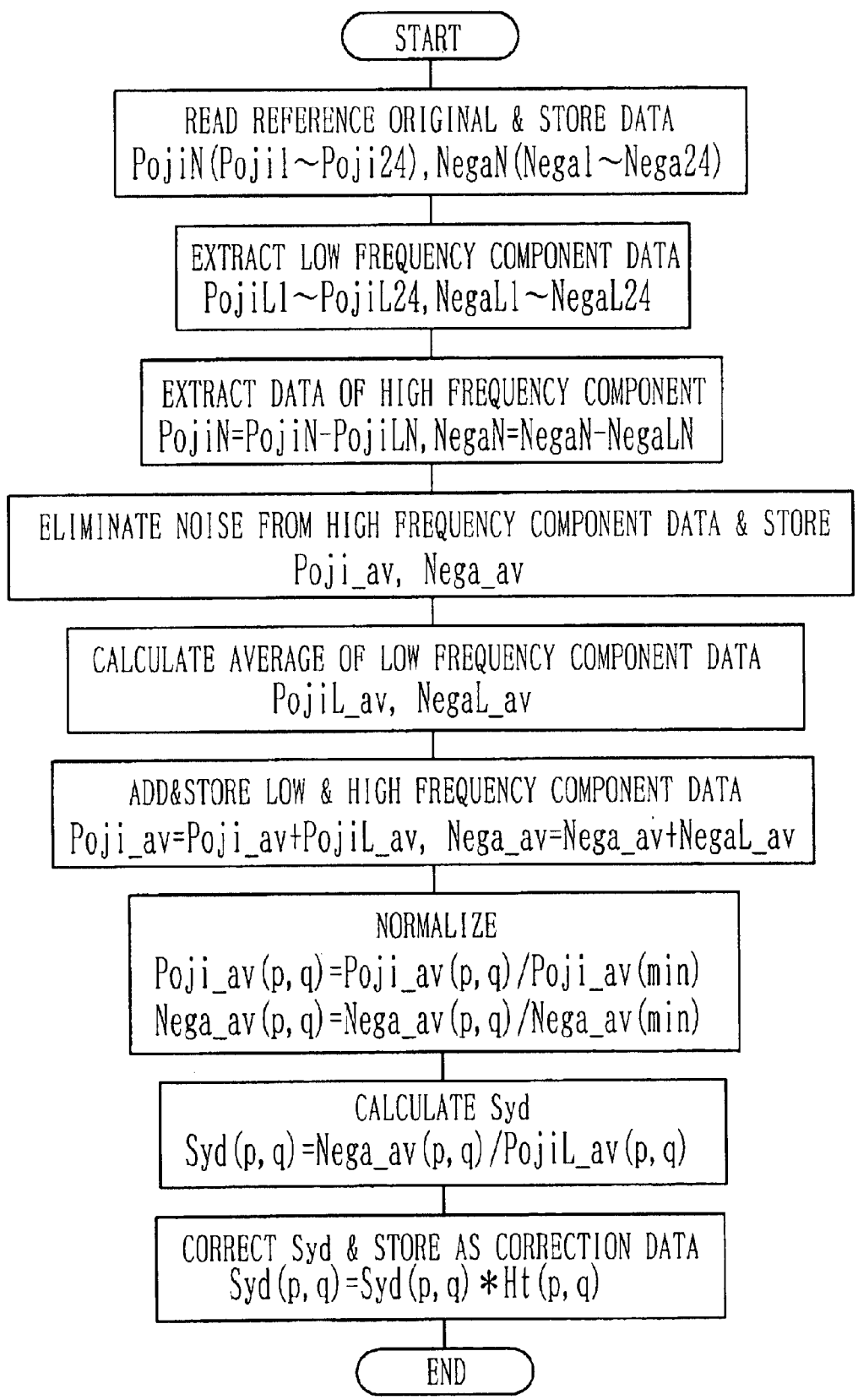
FIG. 4 is a flow chart illustrating a sequence for determining characteristic correction data based on reference data detected from reference originals.

Now the method of determining the correction data will be described with reference to the flow charts shown in FIGS. 4 and 5. The correction data is produced and stored before the printer 10 is shipped from the factory.

First, the positive reference original 67a is set in the film carrier 52, and is fed in the sub scanning direction at a constant speed, so the positive reference original 67a is scanned 24 lines in the main scanning direction. CCD output signals detected from the water coating section 24 lines of the positive reference original 67a are stored for each line as a positive table Poji-n(p,q), wherein n=1~24, p=red, green or blue, and q=pixel serial number in the main scanning line. In the same way as for the positive, the negative reference original 67b is scanned 24 lines, and output signals detected from the water coating section 24 lines of the negative reference original 67b is stored for each line as a negative table Nega-n(p,q), wherein n=1~24, p=red, green or blue, and q=pixel serial number in the main scanning line. Providing that the linear CCD image sensor 54 has the same structure, and each row of the CCD array consists of 5340 CCD cells, each of the positive and negative tables Poji-n (p,q) and Nega-n(p,q) contains table data of 5340 pixels×3 colors. The table data per one pixel is 2 byte fixed point data. An example of the positive table Poji-1(p,q) for the first main scanning line of the positive reference original 67a is partly shown as a graph of broken line in FIG. 6, wherein a noise component is designated by G1.

Figure 7:
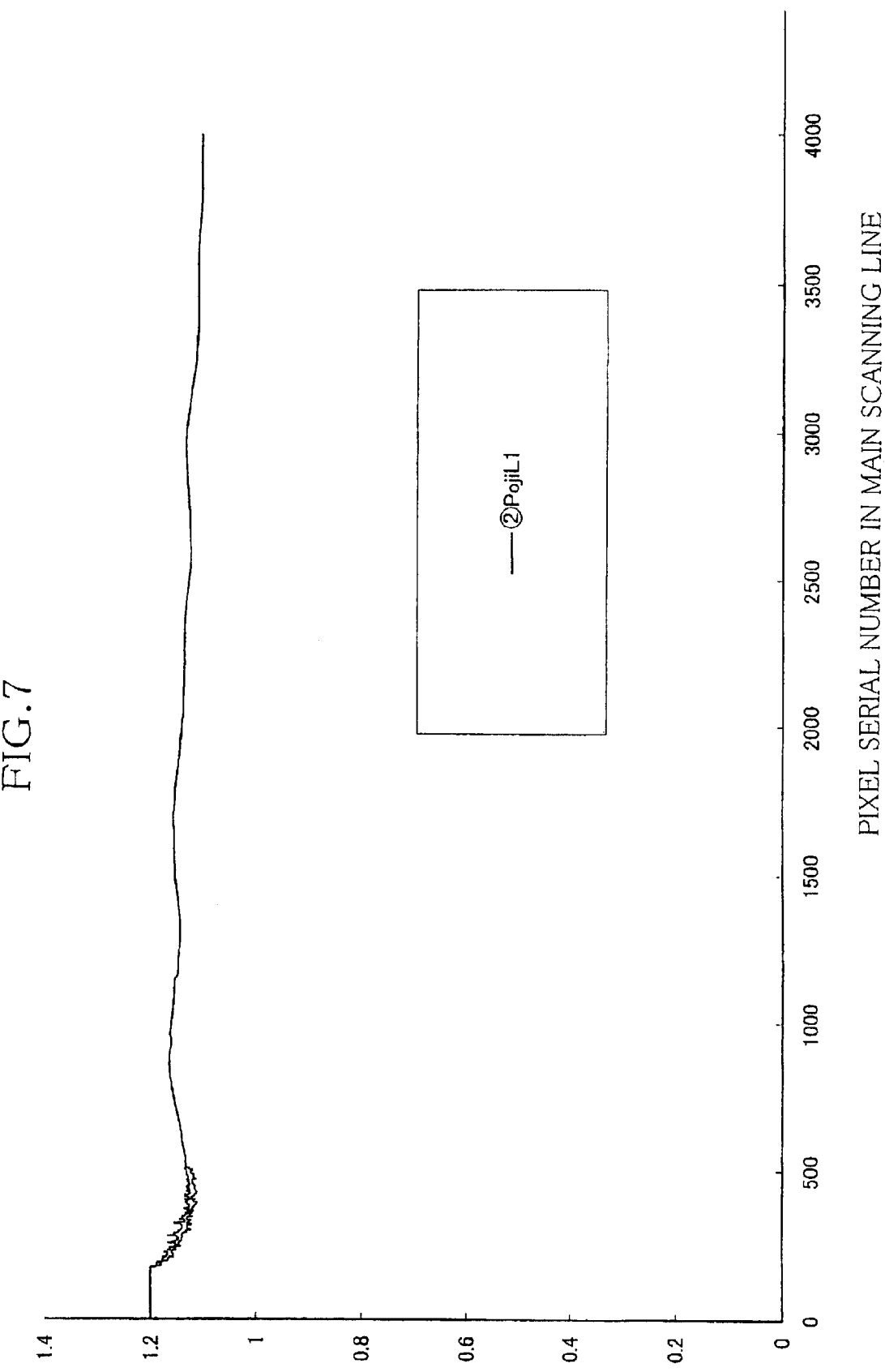
FIG. 7 is a graph of broken line illustrating a fragment of a low frequency component data table PojiL1 for the first main scanning line.

Next, low frequency component data tables PojiL-1(p, q)~ PojiL-24(p,q) and NegaL-1(p,q)~NegaL-24(p,q) are produced by obtaining running mean values from the table data of the respective positive tables Poji-1(p,q)~Poji-24 (p,q) and the respective negative tables Nega-1(p,q)~Nega-24(p,q). FIG. 7 shows an example of the low frequency component data table PojiL-1(p,q) for the first line of the positive reference original 67a. For obtaining the running mean values, the pixels of one main scanning line are divided into seven divisions, and low frequency component data is obtained in a different way from one division to another.

The first division consists of the first to $170^{th}$ pixels, whereas the seventh division consists of the $5171^{st}$ to $5340^{th}$ pixels. The pixels of the first and seventh divisions corresponding to those CCD cells of the CCD image sensor 54 which are not used for scanning the photo film 60. The second, third, fifth and sixth divisions correspond to those CCD cells are used for picking up data from marginal areas of the photo film 60 that are outside the picture frames. The second division consists of the $171^{st}$ to $510^{th}$ pixels (340 pixels), the third division consists of the $511^{th}$ to $610^{th}$ pixels (100 pixels), the fifth division consists of the $4731^{st}$ to $4830^{th}$ pixels (100 pixels), and the sixth division consists of the $4831^{st}$ to $5170^{th}$ pixels (340 pixels).

The fourth division consists of the $611^{th}$ to $4730^{th}$ pixels (4120 pixels) which correspond to those CCD cells used for picking up data from the picture frames. Hereinafter, as far as only the pixel serial number "q" concerns, the table data Poji-n(p,q) and Nega-n(p,q) will be referred to as K(q), whereas low frequency component data PojiL-n(p,q) and NegaL-n(p,q) will be referred to as L(q).

As for the first division, the table data of the $171^{st}$ pixel, i.e. K(171), is used as the low frequency component data L(q) for any pixel of the first division:

$L(q)=K(171)$, when "q"=1~170.

Similarly, the table data of the $5170^{th}$ pixel, i.e. K(5170), is used as the low frequency component data L(q) for any pixel of the seventh division:

$L(q)=K(5170)$, when "q"=5171~5340.

As for the second and sixth division, the table data K(q) of any pixel is directly used as the low frequency component data L(q) of that pixel:

$L(q)=K(q)$, when "q"=171~510 & 4831~5170.

Regarding the third division, the table data K(q) is used as the low frequency component data for the $511^{th}$ pixel, i.e. the initial pixel of the third division. As for the $512^{th}$, the low frequency component data is obtained as a mean value of the table data of the preceding pixel, i.e. the $511^{th}$ pixel, of the $512^{th}$ pixel, and of the next pixel, i.e. the $513^{th}$ pixel. As for the $513^{th}$ pixel, the low frequency component data is obtained as a mean value of the table data of the $511^{th}$ to 515 (=513+2)$^{th}$ pixels. That is, the low frequency component data L(q) for the pixels of the third division is obtained according to the following formula:

$L(q)$=AVERAGE $\{K(511)\sim K(q+(q\sim 511))\}$, wherein "q"=511~610.

In this way, the low frequency component data for the following pixels of the third division is obtained by averaging the table data of an increasing number of pixels which are located around the concerned pixel, as the pixel serial number of the concerned pixel increases. Accordingly, the low frequency component data L(610) for the $610^{th}$ pixel, i.e. the last pixel of the third division, is obtained by averaging the table data of the $511^{th}$ to $709^{th}$ pixels (=199 pixels in total).

For the fourth division consisting of the $611^{th}$ to $4730^{th}$ pixels, the low frequency component data L(q) is obtained by averaging the table data of the concerned pixel and the table data of preceding 100 and following 100 pixels to the concerned pixel (=201 pixels in total):

$L(q)$=AVERAGE $\{K(q-100)+K(q-99)+ \ldots +K(q-1)+K(q)+K(q+1)+K(q+2)+ \ldots +K(q+100)\}$, when "q"=611~4730.

For the fifth division consisting of the $4731^{st}$ to $4830^{th}$ pixels, the low frequency component data L(q) is obtained according to the following formula:

$L(q)$=AVERAGE $\{K(q-(4830-q))\sim K(4830)\}$, wherein "q"=4731~4830.

That is, on the contrary to the third division, the low frequency component data for the initial pixel of the fifth division, i.e. the $4731^{st}$ pixel, is obtained by averaging the table data of the $4731^{st}$ pixel and the table data of the preceding 99 pixels and the following 99 pixels (199 pixels in total). As the low frequency component data for the $4830^{th}$ pixel, i.e. the last pixel of the fifth division, the table data of this pixel is directly used.

Figure 8:
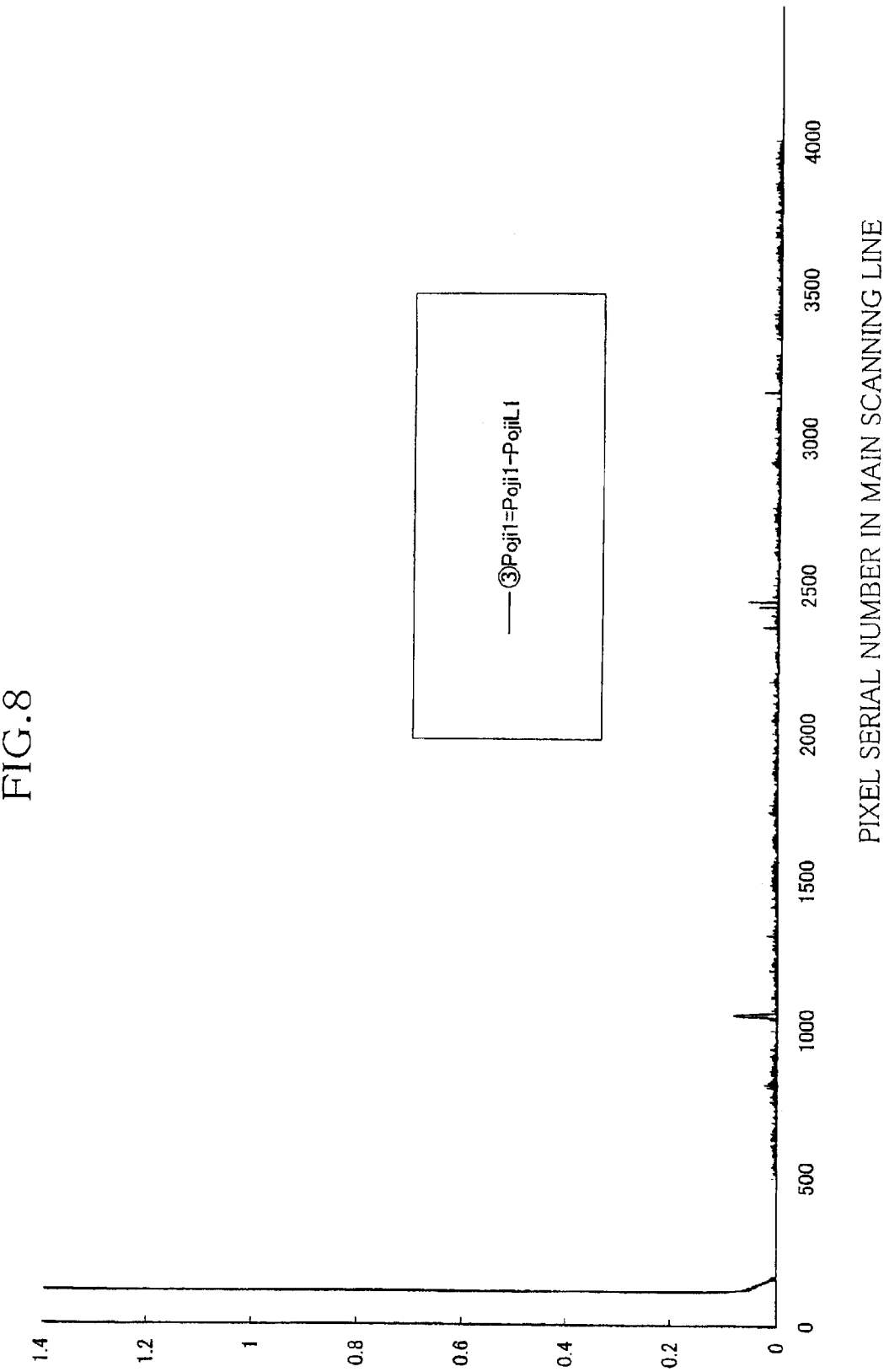
FIG. 8 is a graph of broken line illustrating a fragment of the positive table Pojil as rewritten with high frequency component data for the first main scanning line.

In this way, the low frequency component data tables PojiL-n(p,q) and NegaL-n(p,q), wherein n=1~24, p=R, G, B, and q=1~5340, are obtained for 24 lines. Thereafter, high frequency component data tables are produced. Specifically, the low frequency component data of the tables PojiL-1(p, q)~PojiL-24(p,q) are subtracted from the data of the positive tables Poji-1(p,q)~Poji-24(p,q) in line-to-line and pixel-to-pixel correspondence for each color. By revising the data of the positive tables with the subtraction results, the positive tables are rewritten as the high frequency component data tables for the positive reference original 67a. In the same way, the data of the low frequency component data tables NegaL-1(p,q)~NegaL-24(p,q) are subtracted from the data of the negative tables Nega-1(p,q)~Nega-24(p,q) in line-to-line and pixel-to-pixel correspondence for each color. By revising the data of the negative tables with the subtraction results, the negative tables are rewritten as the high frequency component data tables for the negative reference original 67b. FIG. 8 shows an example of the high frequency component data table for the first line of the positive reference original 67a.

Thereafter, a noise elimination process for eliminating noises from the high frequency component data is carried out, the noises being resulted from stains, scratches or dusts on the reference originals. First, a mean value is calculated for each of the three primary colors from the high frequency component data of those 24 pixels which have the same pixel serial number on the 24 main scanning lines, with respect to each serial number among of the $Bs^{th}$ to the $(5340+1-Bs)^{th}$ pixels of each main scanning line, wherein Bs=a pixel serial number of a beginning point. Thus, the means value Poji-b(p,q) is obtained for one color of those pixels having the same serial number in the 24 positive tables Poji-n(p,q), and the mean value Nega-b(p,q) is obtained for one color of those pixels having the same serial number in the 24 negative tables Nega-n(p,q).

On the other hand, a square of a data value is calculated for each of the three primary colors of each of the $Bs^{th}$ to the $(5340+1-Bs)^{th}$ pixels of each main scanning line, and the squares of those 24 pixels which have the same pixel serial number are added to each other. Thus, a sum of squares Poji-sq(p,q) of data values of those pixels having the same serial number in the 24 positive tables Poji-n(p,q) is obtained for each color, and a sum of squares Nega-sq(p,q) of data values of those pixels having the same serial number in the 24 negative tables Nega-n(p,q) is obtained for each color.

On the basis of these calculation results, a standard deviation Poji-st(p,q) is calculated for each color with respect to each of the Bs-th to the $(5340+1-Bs)^{th}$ pixels of the 24 positive tables, and a standard deviation Nega-st(p,q) is calculated for each color with respect to each of the Bs-th to the $(5340+1-Bs)^{th}$ pixels of the 24 negative tables:

$$Poji\text{-}st(p,q)=SQRT(\{Poji\text{-}sq(p,q)-24\cdot(Poji\text{-}b(p,q))^2\}/24)$$

$$Nega\text{-}st(p,q)=SQRT(\{Nega\text{-}sq(p,q)-24\cdot(Nega\text{-}b(p,q))^2\}/24)$$

wherein SQRT represent positive square root.

Figure 5A:
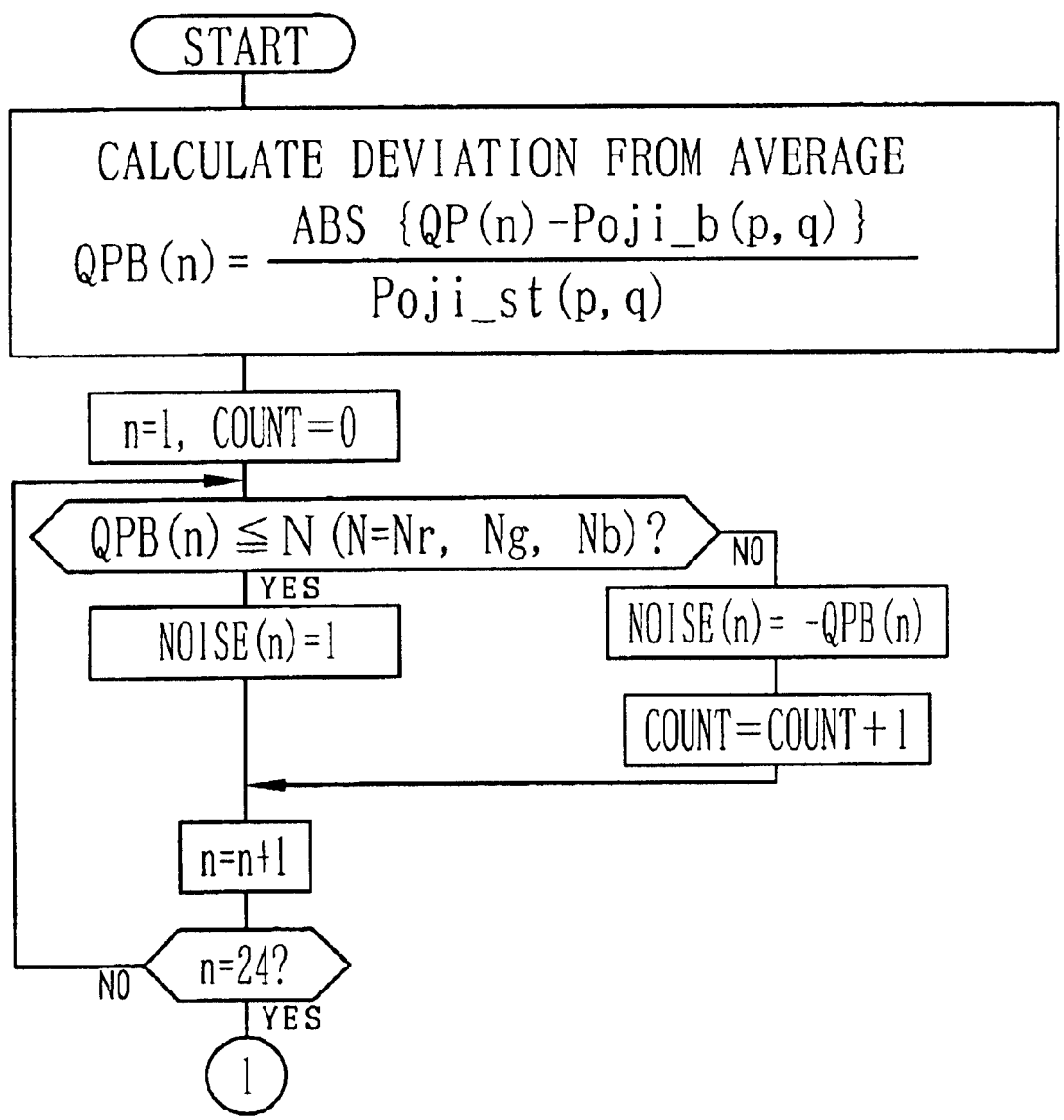
FIGS. 5A and 5B are flow charts illustrating a subsequence for eliminating noise components on the basis of high frequency component data.
Figure 5B:
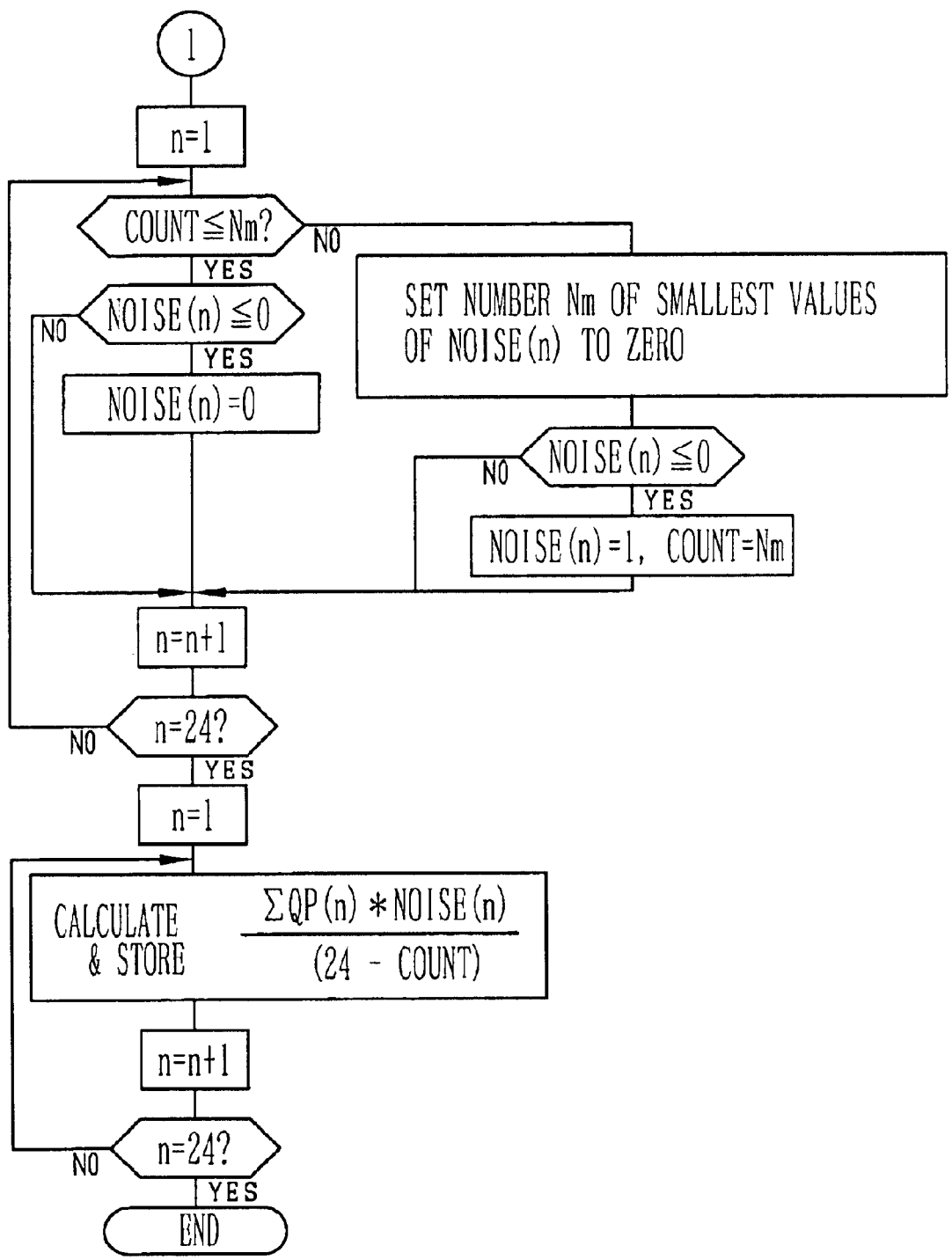

On the basis of these standard deviations, a noise elimination process and an averaging process are executed on the negative and positive tables, according to the sequence shown in FIG. 5. First, on each of the negative and positive tables, high frequency component data of each color of each of the $Bs^{th}$ to $(5340+1-Bs)^{th}$ pixels of the 24 lines is individually discriminated between an effective value and noises. Next, an average of the 24 effective values of one color of those pixels having the same pixel serial number in the 24 lines is obtained, respectively for the negative tables and for the positive tables.

The noise elimination process and the averaging process will be described in more detail, taking the positive tables for example. Providing that data of one color of one of the $Bs^{th}$ to $(5340+1-Bs)^{th}$ pixels of one of the 24 positive tables is expressed as QP(n), n=1~24, every data QP(n), i.e. the high frequency component data of each color of each of the $Bs^{th}$ to $(5340+1-Bs)^{th}$ pixels of each positive table, is individually subjected to the following process. For this process, a noise storage table NOISE(n) having 24 columns for the 24 lines are provided for temporary storage of processing results. Also a counter for counting the number of the noises is prepared, and the count is preset to zero.

First, variations from an average are detected as an absolute value QPB(n) according to the following formula:

$$QPB(n)=|\{QP(n)-Poji\text{-}b(p,q)\}/Poji\text{-}st(p,q)|.$$

Then the absolute variation value QPB(n) is compared to one of three noise discrimination values Nr, Ng and Nb which are predetermined for the three colors, in accordance with the color related to that value QPB(n). If the value QPB(n) is not more than the noise discrimination value Nr, Ng or Nb, the data value of the corresponding noise storage table NOISE(n) is set to "1". If the value QPB(n) is more than the noise discrimination value Nr, Ng or Nb, the data value of the corresponding noise storage table NOISE(n) is set to a negative value "-QPB(n)", and the count of the counter increases one increment "1". In the present embodiment, the noise discrimination values Nr, Ng and Nb are "2".

If the count is not more than a maximum elimination number Nm after the variation values QPB(n) are detected and compared in this way for every data PQ(n) of the 24 lines, the negative values stored in the noise storage table NOISE(n) are rewritten as "0". If, on the contrary, the count is more than the maximum elimination number Nm, the smallest values of the number Nm are rewritten as "0" among the values stored in the noise storage table NOISE (n). Thereafter, if there remain negative values in the noise storage table NOISE(n), these negative values are rewritten as "1". Then, the count is set to be equal to the maximum elimination number Nm. In the present embodiment, the maximum elimination number Nm is "4".

Figure 9:
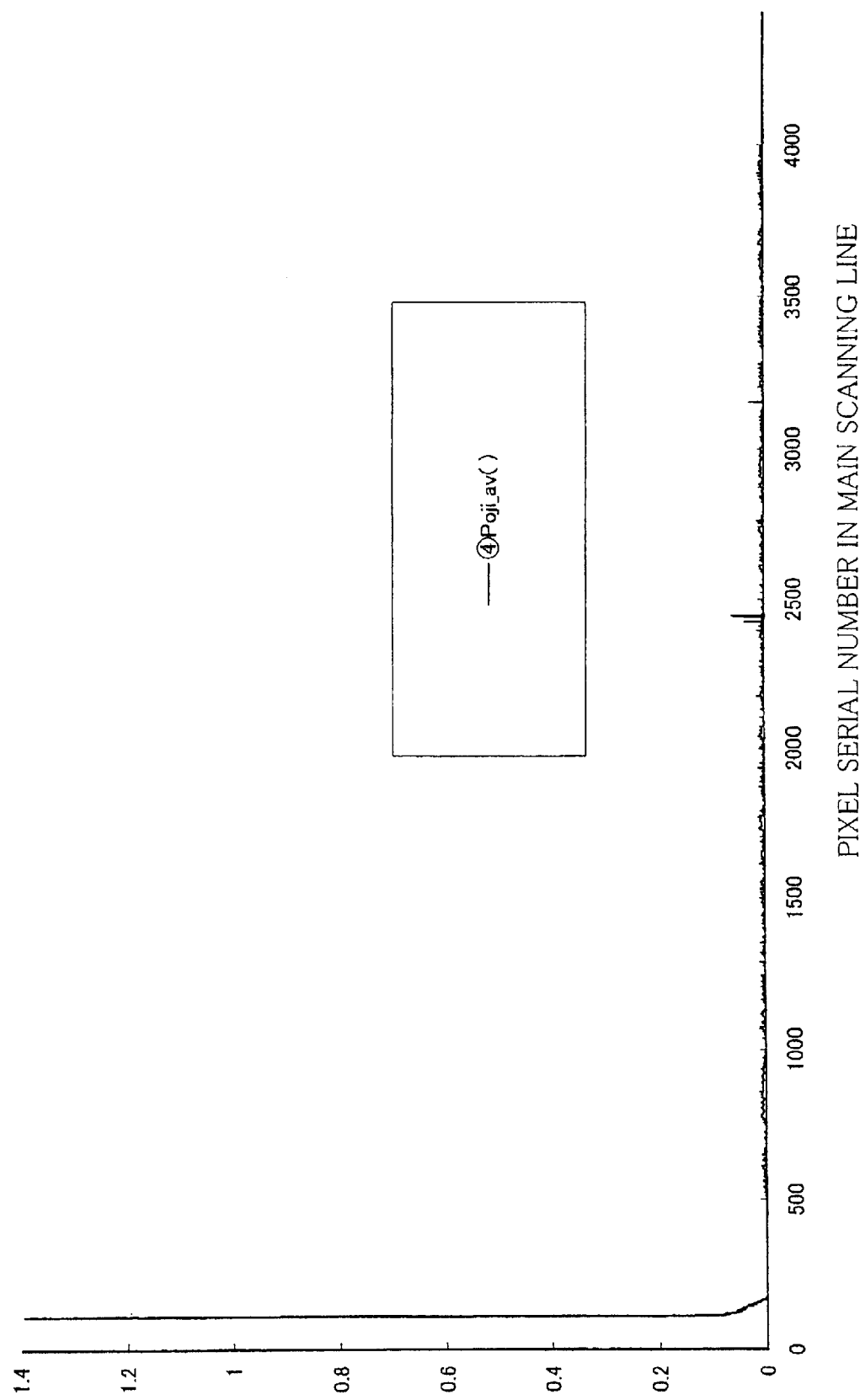
FIG. 9 is a graph of broken line illustrating a fragment of a table Poji-av storing a mean value of high frequency component data per one pixel of one color.

Thereafter, every data QP(n) is multiplied by a corresponding value of the table NOISE(n), and a sum of those products QP(1)·NOISE(1)~QP(24)·NOISE(24) which relate to the same color and the same pixel serial number is divided by a value (24-count), obtaining an average of those values obtained by eliminating noises from the table data of the positive table Poji-n. The subsequent mean value is stored in as Poji-av(p,q). As for the negative table Nega-n, a mean value Nega-av(p,q) is obtained from the table data QP(n) in the same way as for the positive table. FIG. 9 shows an example of the mean values Poji-av(p,q) for the positive as a graph of broken line.

Figure 10:
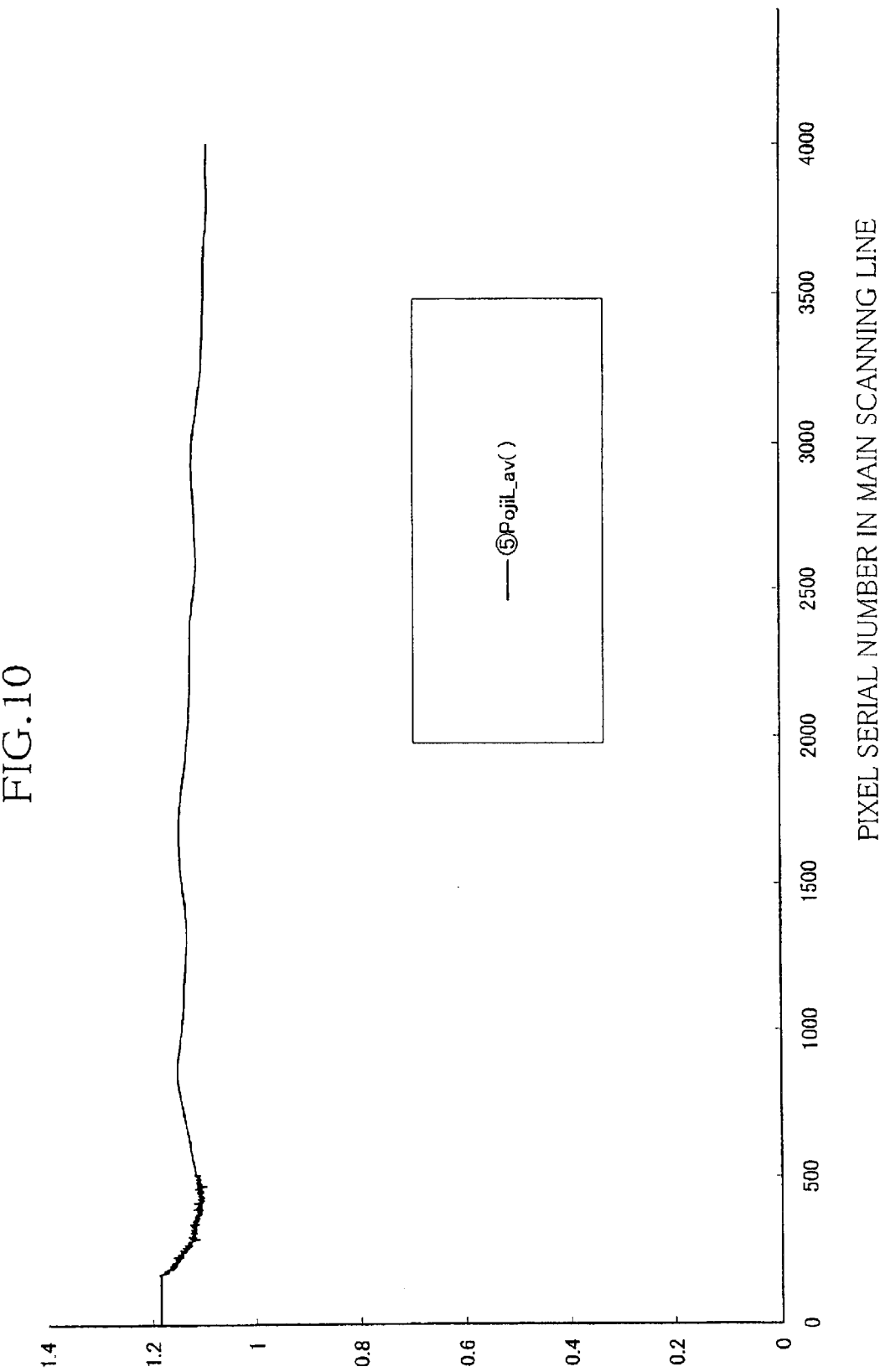
FIG. 10 is a graph of broken line illustrating a fragment of a table PojiL-av storing a mean value of low frequency component data per one pixel of one color.

Next, with respect to the data values of the low frequency component data tables PojiL-n(p,q) and NegaL-n(p,q), which are the running mean values of the table data of the initially produced negative and positive tables, those values which relate to the same color and the same pixel serial number in the 24 lines are averaged to obtain a mean value of these 24 values. The mean values obtained from the 24 tables PojiL-n(p,q) for the 24 lines of the positive reference original 67a will be expressed as PojiL-av(p,q), whereas the mean values obtained from the 24 tables NegaL-n(p,q) for the 24 lines of the negative reference original 67b will be expressed as NegaL–av(p,q). Through the above described averaging process of obtaining a mean value for each pixel of one color, i.e. for each CCD cell, from the running mean values of the reference data, noise components are eliminated from the low frequency component data. Therefore, PojiL–av(p,q) and NegaL–av(p,q) are representative of noise-free low frequency component data. FIG. 10 shows an example of mean values PojiL–av(p,q) as a graph of broken line.

Although the noise reduction from the low frequency component data is done by obtaining running mean values and averaging the running mean values in the above embodiment, it is possible to process the low frequency component data in the same way as the high frequency component data, that is, in the same way as shown in FIG. 5, in order to eliminate those noise components which result from stains, scratches or the like on the reference original.

Thereafter the mean values Poji–av(p,q) and Nega–av(p,q), which are representative of the noise-free high frequency component data, are added to the mean values PojiL–av(p,q) and NegaL–av(p,q) in pixel-to-pixel and color-to-color correspondence, respectively for positive and negative, and then the calculation results are written as revised data values Poji–av(p,q) and Nega–av(p,q):

$$Poji\text{-}av(p,q)=Poji\text{-}av(p,q)+PojiL\text{-}av(p,q)$$

$$Nega\text{-}av(p,q)=Nega\text{-}av(p,q)+NegaL\text{-}av(p,q).$$

Figure 11:
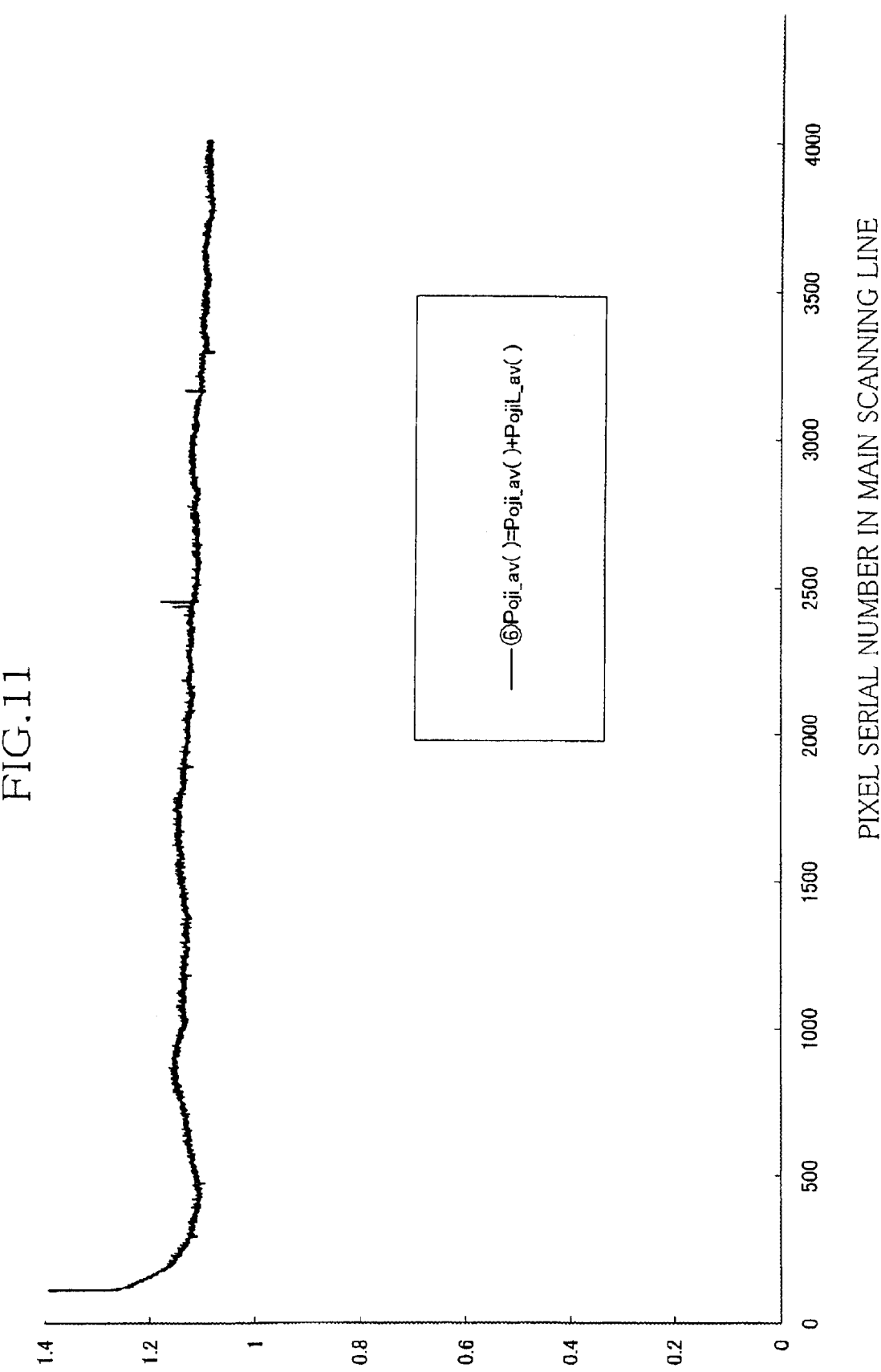
FIG. 11 is a graph of broken line illustrating a fragment of a table Poji-av storing a sum of high and low frequency component data per one pixel of one color.

FIG. 11 shows an example of the values Poji–av(p,q) obtained in this process.

Thereafter, the value Poji–av(p,q) or Nega–av(p,q) is individually normalized for each color with respect to each of the $Bs^{th}$ to $(5340+1-Bs)^{th}$ pixels, according to the following formula:

$$Poji\text{-}av(p,q)=Poji\text{-}av(p,q)/Poji\text{-}av(min)$$

$$Nega\text{-}av(p,q)=Nega\text{-}av(p,q)/NegaL\text{-}av(min)$$

wherein Poji–av(min) and Nega–av(min) respectively represent a minimum value of each color.

Figure 12:
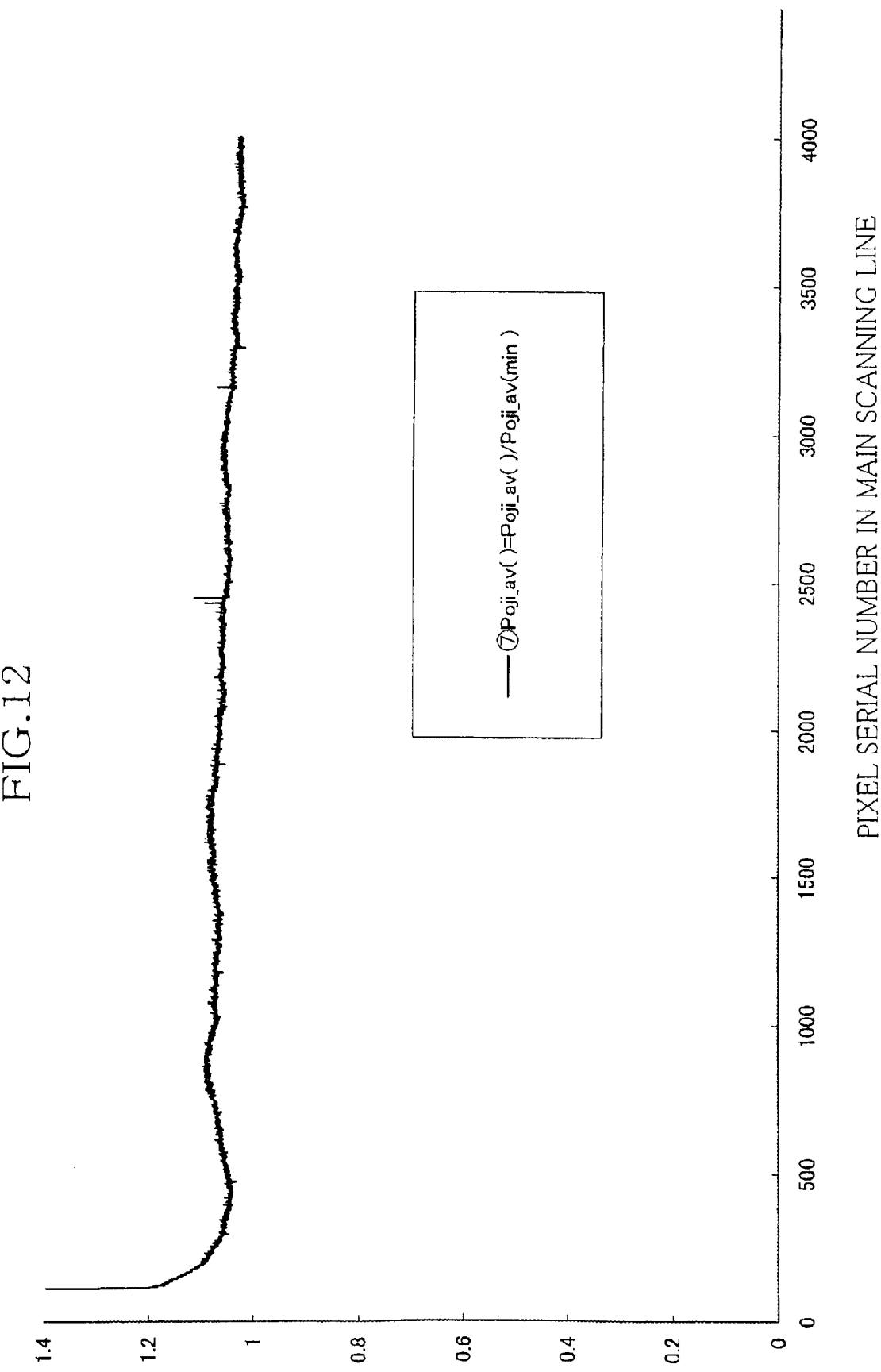
FIG. 12 is a graph of broken line illustrating a fragment of a normalized positive table Poji-av.

FIG. 12 shows a fragment of a normalized positive table as a graph of broken line. As compared to the graph of FIG. 6, it is apparent from the graph of FIG. 12 that the noise components, e.g. G1 in FIG. 6, are well eliminated from the table data of the normalized positive table.

Thereafter, the ratio Syd(p,q) of the data value Nega–av(p,q) of the positive table to the data value Poji–av(p,q) of the negative table is calculated for each color with respect to each of the $Bs^{th}$ to $(5340+1-Bs)^{th}$ pixels:

$$Syd(p,q)=Nega\text{-}av(p,q)/Poji\text{-}av(p,q)$$

Then, the ratio Syd(p,q) calculated for the Bs-th pixel (q=Bs) is copied and used as the ratio Syd(p,q) for any of the first to $(Bs-1)^{th}$ pixels. With respect to the $(5340+2-Bs)^{th}$ to $5340^{th}$ pixels, the ratio Syd(p,q) calculated for the $(5340+1-Bs)^{th}$ pixel (q=5340+1-Bs) is copied and allocated to these pixels.

Next, the ratios Syd(p,q) are multiplied by correction values Ht(p,q) that are predetermined for correcting shading caused by factors relating to the light source 51 and the lens unit 53 of the film scanner 12. The multiplication results Syd(p,q)·Ht(p,q) are written as the correction data on the correction data memory 72 (see FIG. 3), and used for correcting the line signals from the CCD image sensor 54.

Although the elimination process for eliminating noises as resulted from stains, scratches or dusts on the reference originals is effected on the high frequency component in the above embodiment, it is alternatively possible to use mean values of the low frequency components as the correction data for the line signals. Since the noise components resulted from stains and the like on the reference originals, e.g. G1 in FIG. 6, are eliminated as the high frequency components from the low frequency components, as shown in FIG. 10, it is possible to suppress the influence of the noises resulted from the stains on the reference originals and the like.

Noise components resulting from the stains on the reference originals may be eliminated from the high frequency components in a different way from the above described embodiment. According to an embodiment of the present invention, to eliminate the noise components, the CCD cells of one row or the pixels of one main scanning line are divided into small segments, each segment having a length that should be less than a portion having the noise, and high frequency component data is correlated with respect to each segment, and then the average of the high frequency component data is obtained after excluding data of those segments where the data correlation is little.

For instance, where the size of a stain on the reference original 67a or 67b is assumed to be 0.2 mm, and the lens unit 53 has a lens magnification of 0.7×, an optical image of the stain will have a size of 0.14 (0.2×0.7) mm on the CCD image sensor 54. Assuming that each CCD cell of the CCD image sensor 54 has a length of 8 μm in the main scanning direction, the noise component resulted from that stain corresponds in size to 17.5 pixels (0.14 mm/8 μm=17.5). For this case, a threshold between the high frequency component and the low frequency component is determined to be 35 (=17.5×2) pixels. Also, each segment of the main scanning line is determined to be constituted of pixels of not more than (17.5÷2), e.g. 8 pixels. Then, correlation between three high frequency component data values of three pixels having the same pixel serial number is detected in association with the respective pixel serial numbers of the 8 pixels of the individual segment. Provided that X(1~8), Y(1~8) and X(1~8) represent the three data values of the three pixels of the same pixel serial number, the correlation between the three data values is detected by comparing the data values X, Y and Z to each other, i.e. X to Y, Y to Z, and Z to X.

Provided that E(A) represents an average of a group of data values, and "A" represents the data group and is substituted for X, Y and Z, and that V(A) represents a standard deviation of the data group, a correlation coefficient Cxy between the data group X and the data group Y may be expressed as follows:

$$Cxy=E((X-E(X))\cdot(Y-E(Y)))/(V(X)\cdot V(Y)).$$

In the same way, a correlation coefficient Czx between the data group Y and the data group X, and a correlation coefficient Cyz between the data group Y and the data group Z are calculated, and relating two of the correlation coefficients Cxy, Czx and Cyz are added to each other in relation to the respective data groups X, Y and Z to obtain correlation coefficients Cx, Cy and Cz for the respective data groups X, Y and Z:

$$Cxy+Czx=Cx$$

$$Cxy+Cyz=Cy$$

$$Cyz+Czx=Cz$$

Thereafter, the correlation coefficients Cx, Cy and Cz are compared to each other. If one of these three values remarkably differs from the other two values, the data group related to that value is judged to be less correlated to the other data groups. For example, where Cx=0.9, Cy=1.0 and Cz=0.3, the data group Z is judged to have little correlation to the data groups X and Z.

There are three criteria for determining the least correlated data group among the three data groups X, Y and X:

1. The data group whose correlation coefficient is the smallest is judged as the least correlated data group;
2. The data group whose correlation coefficient is not more than a predetermined threshold value, e.g. 0.5, is judged as the least correlated data group; and
3. The data group whose correlation coefficient is not more than a predetermined value in ratio to a mean value of the three correlation coefficients Cx, Cy and Cz, e.g. 0.5, is judged as the least correlated data group.

In the above example, the data group Z having the value Cz is judged to have the least correlation with reference to any of the three criteria.

To eliminate the noise components, mean values of the high frequency components of those data groups excluding the least correlated data group are calculated.

It is possible to detect the correlation between four or more data groups. Since the number of couples to compare to each other would be increased if each of the data groups is to be correlated to every other data group, it is preferable to correlate adjoining three of the data groups to each other in the same way as above, in order to reduce calculation processes for detecting the correlation. For example, where the correlation between four data groups X, Y, Z and W should be detected, the data group X is correlated to the data groups Y and Z, the data group Y is correlated to the data groups Z and W, the data group Z is correlated to the data groups W and X, and the data group W is correlated to the data groups X and Y.

According to another embodiment, the correlation is detected twice for each individual segment, that is, once in a normal position and then in a shifted position where the dividing positions are shifted in the main scanning direction by half the length of the segments. The average of the high frequency components is obtained after eliminating those pixels which have little correlation.

Figure 13A:
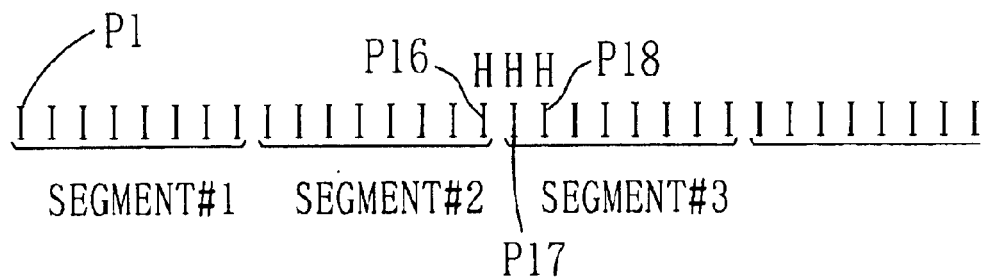
FIGS. 13A and 13B are explanatory diagrams illustrating a noise elimination method according to another embodiment of the present invention.
Figure 13B:
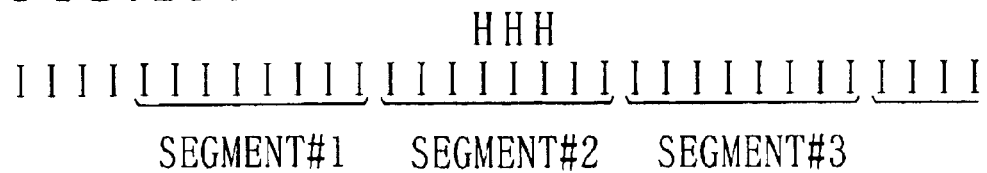

As shown for example in FIG. 13A, where the CCD cells are divided into 8-pixel segments from end to end of each row in the normal position, and if the $16^{th}$ to $18^{th}$ pixels have noise components H, the correlation would not be so little with respect to the second and third segments even through these segments include the noise components H. However, where the dividing positions are shifted by 4 pixels, as shown in FIG. 13B, the noise components H appear in the second segment alone. As a result, the correlation becomes little with respect to the second segment. By obtaining the average while excluding those pixels belonging to the shifted second segment, the noise components resulted from the stains or scratches on the reference original will be efficiently eliminated.

Although the correction data for each CCD cell is produced on the basis of those reference data values which are detected through that CCD cell from different sub-scanning points of the same reference original in the above embodiment, it is possible to detect reference data from a plurality of reference originals having the same density and color.

Although the correction data is produced and stored before the printer 10 is shipped from the factory in the above embodiment, it is possible to produce and revise the correction data periodically after the shipment, e.g. when the power switch is turned on, when a predetermined time has elapsed, when a filmstrip is newly set, or each time a picture frame is scanned. Thereby, it becomes easy to adjust to the change in the illumination amount resulted from the aging of the light source.

It is also possible to prepare different reference originals for different types of negative films, in order to produce specific correction data for each type, i.e. for each film speed of each film marker. Besides the positive and negative films, reference originals for DCN film, black-and-white film, sepia film and other kinds of films may be prepared for producing correction data for those films.

Although the above embodiments have been described with respect to the film scanner, the present invention is applicable to the scanner for reflective originals. The present invention is also applicable to those scanners which use an area image sensor, and digital still cameras and digital video cameras in order to correct the image data in accordance with characteristics of the image sensor.

Thus, the present invention is not to be limited to the above embodiment but, on the contrary, various modifications will be possible to those skilled in the art without departing from the scope of claims appended hereto.

What is claimed is:

1. A method of determining characteristic correction data based on reference data values picked up through an image sensor by scanning at least a reference original a plurality of times per one photoelectric conversion element of said image sensor, said reference original being uniform in density or in color and density, said characteristic correction data correcting characteristics of said photoelectric conversion elements, said method comprising steps of:

discriminating said reference data values between data of high spatial frequency components and data of low spatial frequency components; and processing said high spatial frequency component data and said low spatial frequency component data differently from each other, to produce said characteristic correction data.

2. A method of determining characteristic correction data as recited in claim 1, wherein each of said photoelectric conversion elements picks up said reference data values from different points of the same reference original, or from a plurality of reference originals having the same properties.

3. A method of determining characteristic correction data as recited in claim 1, wherein said discriminating step comprises steps of:

calculating a running mean value of said reference data values with respect to a respective one of said photoelectric conversion elements, to serve said running mean values as said low spatial frequency component data; and subtracting said running mean values from said reference data values with respect to the respective one of said photoelectric conversion elements, to serve subsequent differences as said high spatial frequency component data.

4. A method of determining characteristic correction data as recited in claim 3, wherein said characteristic correction data is produced on the basis of said low spatial frequency component data alone.

5. A method of determining characteristic correction data as recited in claim 3, wherein said processing step comprises steps of:

eliminating noises respectively from said high spatial frequency component data and said low spatial frequency component data; and thereafter adding said high spatial frequency component data and said low spatial frequency component data to each other in association with the respective one of said photoelectric conversion elements.

6. A method of determining characteristic correction data as recited in claim 1, wherein said high spatial frequency components and said low spatial frequency components are discriminated from each other with reference to a threshold level that is determined by a size of a number of said photoelectric conversion elements which corresponds to a length twice or more than twice a length of a portion of the reference original having a noise component projected on said image sensor when the size of the number of said photoelectric conversion elements is substituted for the length.

7. A method of determining characteristic correction data as recited in claim 6, wherein said characteristic correction data is produced on the basis of said low spatial frequency component data alone.

8. A method of determining characteristic correction data as recited in claim 6, wherein said processing step comprises steps of:

eliminating noises respectively from said high spatial frequency component data and said low spatial frequency component data; and thereafter adding said high spatial frequency component data and said low spatial frequency component data to each other in association with the respective one of said photoelectric conversion elements.

9. A method of determining characteristic correction data as recited in claim 8, wherein the noises are eliminated from said high spatial frequency component data by the following steps:

dividing said photoelectric conversion elements into segments of a constant length along a main scanning direction, said constant length being shorter than said length of said noise component;

determining a correlation between three or more data groups of said high spatial frequency component data in each of said segments, said data groups being included in said reference data values which are picked up said plurality of times per one photoelectric conversion element; and averaging said high spatial frequency component data after excluding data values of those segments where the data correlation is small.

10. A method of determining characteristic correction data as recited in claim 9, wherein a correlation between four or more of said data groups is determined in each of said segments by comparing each of said data groups to other at least two data groups among said four or more data groups, said data groups being included in said reference data values which are obtained said plurality of times per one photoelectric conversion element.

11. A method of determining characteristic correction data as recited in claim 9, wherein after a correlation between said data groups is determined in each of said segments, said photoelectric conversion elements are divided into second series of segments are shifted by a half of said constant length in the main scanning direction from said first series of segments, and then a correlation between data groups is determined in each of said second segments, and wherein averaging of said high spatial frequency component data is carried out after excluding data values of those segments where the data correlation is small, among said first or said second series of segments.

12. A method of determining characteristic correction data as recited in claim 5, wherein said noise eliminating step comprises steps of:

calculating a standard deviation $\sigma$ and a mean value AV of said high spatial frequency component data with respect to the respective one of said photoelectric conversion elements; and averaging said high spatial frequency component data with respect to the respective one of said photoelectric conversion elements, using only those data values which are not less than $AV-K\sigma$ and not more than $AV+K\sigma$, K being a predetermined constant.

13. A method of determining characteristic correction data as recited in claim 12, wherein if the number of those data values which are less than $AV-K\sigma$ or more than $AV+K\sigma$ is greater than a predetermined constant C, the averaging of said high spatial frequency component data is executed after excluding data values of a limited number that is equal to the constant C, sequentially from such data values of which an absolute value $|AV-D|$, D being the data value, is the largest.

14. A method of determining characteristic correction data as recited in claim 13, wherein said constant K is 1.0 or more, and said constant C is 2 or more.

15. A method of determining characteristic correction data as recited in claim 12, wherein said noise eliminating step comprises steps of:

calculating a standard deviation $\sigma$ and a mean value AV of said low spatial frequency component data with respect to the respective one of said photoelectric conversion elements; and averaging said low spatial frequency component data with respect to the respective one of said photoelectric conversion elements, using only those data values which are not less than $AV-K\sigma$ and not more than $AV+K\sigma$, K being a predetermined constant.

16. A method of determining characteristic correction data as recited in claim 15, wherein if the number of those data values which are less than $AV-K\sigma$ or more than $AV+K\sigma$ is greater than a predetermined constant C, the averaging of said low spatial frequency component data is executed after excluding data values of a limited number that is equal to the constant C, sequentially from such data values of which an absolute value $|AV-D|$, D being the data value, is the largest.

17. A method of determining characteristic correction data as recited in claim 16, wherein said constant K is 1.0 or more, and said constant C is 2 or more.

18. The method of claim 1, wherein spatial frequency corresponds inversely to a periodicity over distance with which an image value changes.

19. An apparatus for determining characteristic correction data comprising:

a reference data picking up device for picking up reference data values through an image sensor by scanning at least a reference original a plural number of times per one photoelectric conversion element of said image sensor, said reference original being uniform in density or in color and density;

a discrimination device for discriminating said reference data values between data of high spatial frequency components and data of low spatial frequency components;

a noise eliminating device for eliminating noise components from said high spatial frequency component data, said noise components resulting from noise factors existing on said reference original; and a characteristic correction data calculating device that calculates a mean value of said plural number of data values of said high spatial frequency components after said noise components are eliminated, and a mean value of said plural number of data values of said low spatial frequency components with respect to the respective one of said photoelectric conversion elements, and then adds said mean values of said low and high spatial frequency component data with respect to the respective one of said photoelectric conversion elements, to produce said characteristic correction data for each photoelectric conversion element.

20. An apparatus for determining characteristic correction data as recited in claim 19, wherein said reference data picking up device picks up said reference data values from different points of the same reference original, or from a plurality of reference originals having the same properties through the respective one of said photoelectric conversion elements.

21. An apparatus for determining characteristic correction data as recited in claim 19, wherein said discrimination device calculates a running mean value of said reference data values with respect to the respective one of said photoelectric conversion elements, to serve said running mean values as said low spatial frequency component data, and subtracts said running mean values from said reference data values with respect to the respective one of said photoelectric conversion elements, to serve subsequent differences as said high spatial frequency component data.

22. The apparatus of claim 19, wherein spatial frequency corresponds inversely to a periodicity over distance with which an image value changes.

* * * * *